United States Patent
Telldén

[11] Patent Number: 4,806,069
[45] Date of Patent: Feb. 21, 1989

[54] ROBOT WRIST
[75] Inventor: Leif Telldén, Västerås, Sweden
[73] Assignee: ASEA Aktiebolag, Västerås, Sweden
[21] Appl. No.: 60,310
[22] Filed: Jun. 10, 1987
[30] Foreign Application Priority Data
Jun. 12, 1986 [SE] Sweden ............................... 8602626
[51] Int. Cl.⁴ .............................................. B66C 1/10
[52] U.S. Cl. ..................................... 414/735; 74/392;
74/409; 901/26; 901/29
[58] Field of Search ................ 74/392, 397, 409, 211;
901/25, 29, 26; 414/735

[56] References Cited
U.S. PATENT DOCUMENTS

| | | | |
|---|---|---|---|
| 1,171,347 | 2/1916 | Morse | 74/397 |
| 2,444,734 | 7/1948 | Gillett | 74/409 X |
| 3,150,533 | 9/1964 | Wallgren | 74/392 X |
| 3,329,035 | 7/1967 | Herr | 74/409 |
| 3,347,110 | 10/1967 | Wilson | 74/409 X |
| 4,147,071 | 4/1979 | Scribner et al. | 74/409 |
| 4,532,822 | 8/1985 | Godlewski | 74/397 |
| 4,576,544 | 3/1986 | Passemard et al. | 414/735 |

FOREIGN PATENT DOCUMENTS

| | | | |
|---|---|---|---|
| 503964 | 1/1920 | France | 74/211 |
| 735853 | 8/1980 | U.S.S.R. | 74/392 |

Primary Examiner—Robert J. Spar
Assistant Examiner—William M. Hienz
Attorney, Agent, or Firm—Watson, Cole, Grindle & Watson

[57] ABSTRACT

The bending and turning movements of the wrist are brought about by drive motors via at least one gear train, in which a cylindrical gear pinion drives a cylindrical gear wheel via an intermediate wheel. For adjusting the backlash, the intermediate wheel is journalled on a movable support which makes contact with a cylindrical guide surface in the wrist housing and can be displaced, by means of two adjusting screws, along a circular path, the center of which coincides with the axis of rotation of the gear pinion. The intermediate wheel is journalled on an eccentric bearing pin on the movable support.

13 Claims, 5 Drawing Sheets

ROBOT WRIST

TECHNICAL FIELD

The present invention relates to industrial robots, and more particularly to robot wrists of the kind which include a wrist housing mounted on a robot arm; a wrist part (tilt), turnably journalled in the wrist housing, the turning axis of the tilt being perpendicular to the longitudinal axis of the robot arm; a tool attachment rotatably journalled in the tilt, and drive means for turning the tilt and the tool attachment. The drive means include at least one pair of cylindrical gear wheels.

BACKGROUND ART

To achieve precision in a robot, it is important that the backlashes in the gear units of the wrist are as small as possible. For that reason, it is common to make the gear units adjustable. Several designs enabling adjustment of the backlash between two cylindrical gear wheels are known. However, many of these are space-demanding and, therefore, less suitable for use in robot wrists in which a slender design with good accessibility in narrow spaces, for example, inside car bodies, etc., is aimed at. Another frequently occurring disadvantage with prior art designs of this kind is that the after-adjustment thereof is a time-consuming operation.

DISCLOSURE OF THE INVENTION

The object of the invention is to achieve a wrist of the abovementioned kind in which adjustment of the backlash in the cylindrical gear unit of the wrist can be carried out in a simple and rapid manner and in which the means required for this adjustment do not influence the dimensions of the wrist to any significant extent.

According to the invention, the above is achieved by mounting an intermediate wheel, arranged between two cylindrical gear wheels in the gear unit, on a movable support which is displaceable by means of adjusting members along a circular path, the centre of which coincides with the axis of rotation of one of the gear wheels. This design, in which the intermediate wheel, upon displacement of the support, automatically seeks its position between the two gear wheels, makes possible a rapid adjustment of the backlash.

The support can suitably be guided by a circular-cylindrical wall surface in the wrist housing. This results in a space-saving construction, and greater mechanical stability of the drive members is obtained by transferring the shaft forces of the intermediate wheel directly to the wrist housing.

According to a further development of the invention, the intermediate wheel is mounted on an eccentric shaft pin arranged on the movable support. This makes it possible to carry out separate adjusting of the backlash between the intermediate wheel and each one of the two gear wheels. In addition, in such an embodiment relatively great machining tolerances can be permitted.

BRIEF DESCRIPTION OF THE DRAWINGS

The invention will be described in greater detail below with reference to an embodiment shown in the accompanying drawing, wherein.

DESCRIPTION OF THE PREFERRED EMBODIMENT

Figure 1:
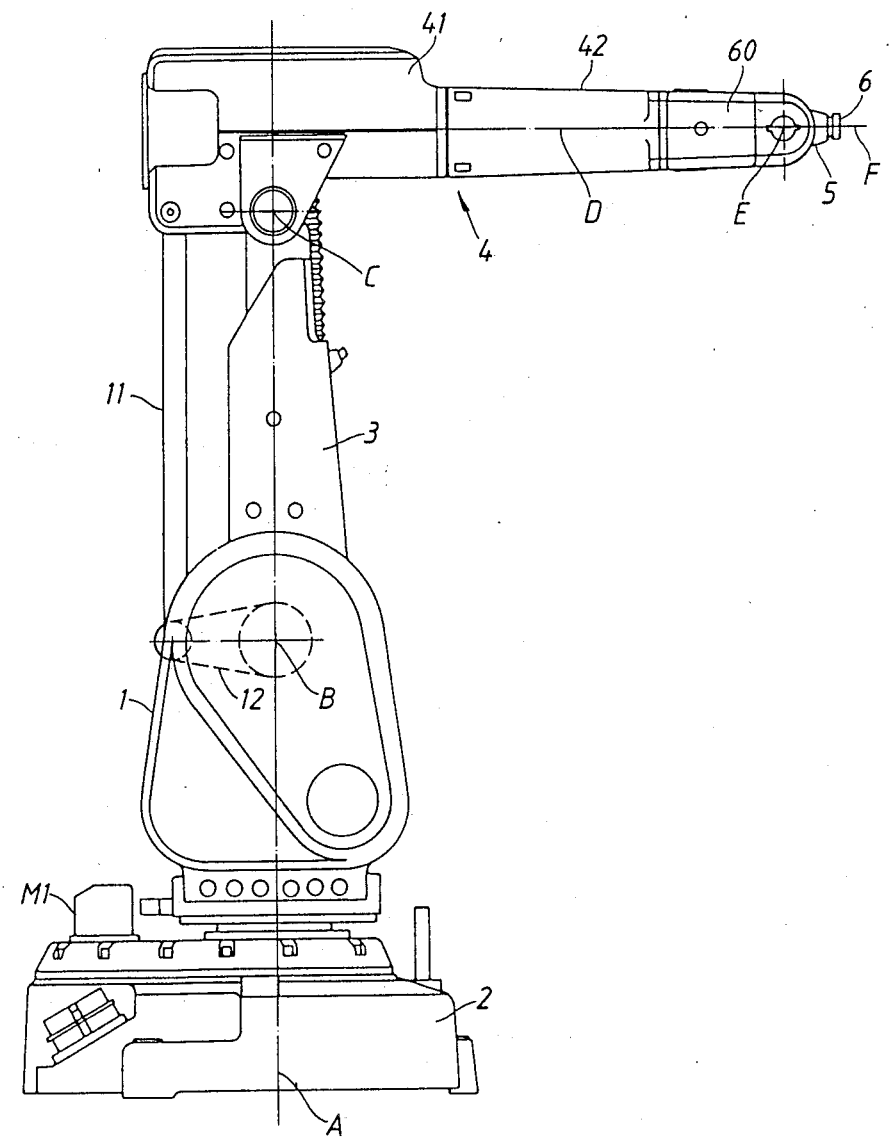
FIG. 1 is a side view of an industrial robot according to the present invention.

The robot shown in FIG. 1 has a stand 1 which can be rotated, by means of a motor M1, relative to a base plate 2 about a vertical axis A. A first robot arm 3, the primary arm, is pivotably journalled in the stand 1 about an axis B. At the upper end of the arm 3 a second arm 4, the secondary arm, is pivotably journalled about an axis C. The pivoting of the arm 4 takes place over a parallel link rod 11, the lower end of which is articulately connected to a motor-driven crank 12 and the upper end of which is articulately connected to the rear part of the arm 4. Motors with gear units for pivoting the arms 3 and 4 are built into the stand 1.

Figure 2:
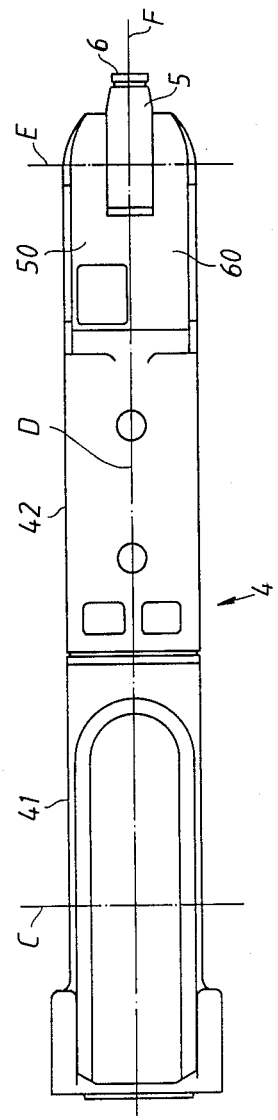
FIG. 2 is a top view of the secondary arm of the robot.

FIG. 2 shows a top view of the secondary arm 4 of the robot. It consists of a rear part 41, which is turnable about the axis C, and a tubular front part 42 which is journalled in the rear part 41 and is turnable about the longitudinal axis D of the arm 4. The outer end portion of the front arm part 42 consists of a wrist which is built up of two wrist halves 50, 60, between which a wrist part 5, the tilt, which is turnable about an axis E and is provided with a tool attachment in the form of a turning disc 6, is journalled. The turning disc 6 is turnable about the longitudinal axis F of the tilt 5.

Figure 3:
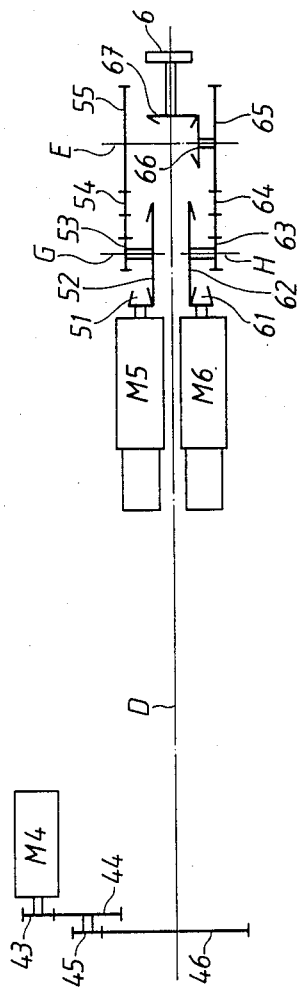
FIG. 3 is an explanatory sketch of the drive means for the different parts in the wrist.

FIG. 3 shows the arrangement for driving the front arm part 42, the tilt 5 and the turning disc 6. The front arm part 42 is driven by a motor M4 via a gear unit with four cylindrical gear wheels 43, 44, 45 and 46, the wheel 46 being fixedly connected to the arm part 42.

The tilt 5 is driven by a motor M5 via a bevel gear pinion 51, which is fixed on the motor shaft and which is in engagement with a bevel gear wheel 52 rotatably journalled in the wrist housing about an axis G positioned perpendicular to the axis of rotation D of the front arm part 42. The bevel gear wheel 52 is fixedly connected to a cylindrical gear pinion 53, which in its turn, via an intermediate wheel 54, drives a gear rim 55 which is fixedly connected to the tilt housing.

The drive means for turning the disc 6 (like the drive means for the tilt) comprises a motor M6 on whose shaft a bevel gear pinion 61 is located which is in engagement with a bevel gear wheel 62 journalled in the wrist housing and being rotatable about an axis H positioned perpendicular to the axis of rotation D of the front arm part 42. The bevel gear wheel 62 is joined to a cylindrical gear pinion 63, which via an intermediate wheel 64 drives a cylindrical gear wheel 65 which is rotatably journalled about the pivot axis E of the tilt 5. The gear wheel 65 is joined to a bevel gear pinion 66 which is in engagement with a bevel gear wheel 67, which is fixedly connected to the turning disc 6.

Figure 4:
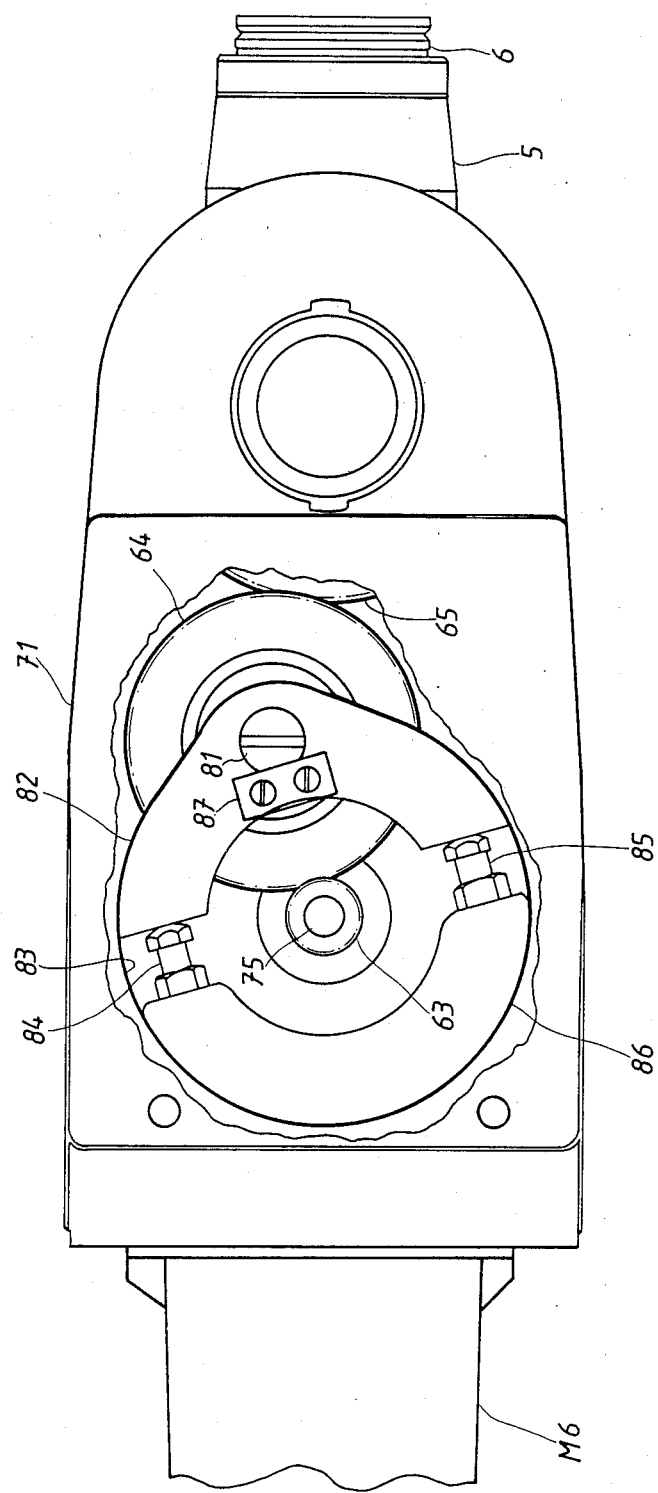
FIG. 4 is a side view of the wrist with a part of the wall of the wrist housing cut away.
Figure 5:
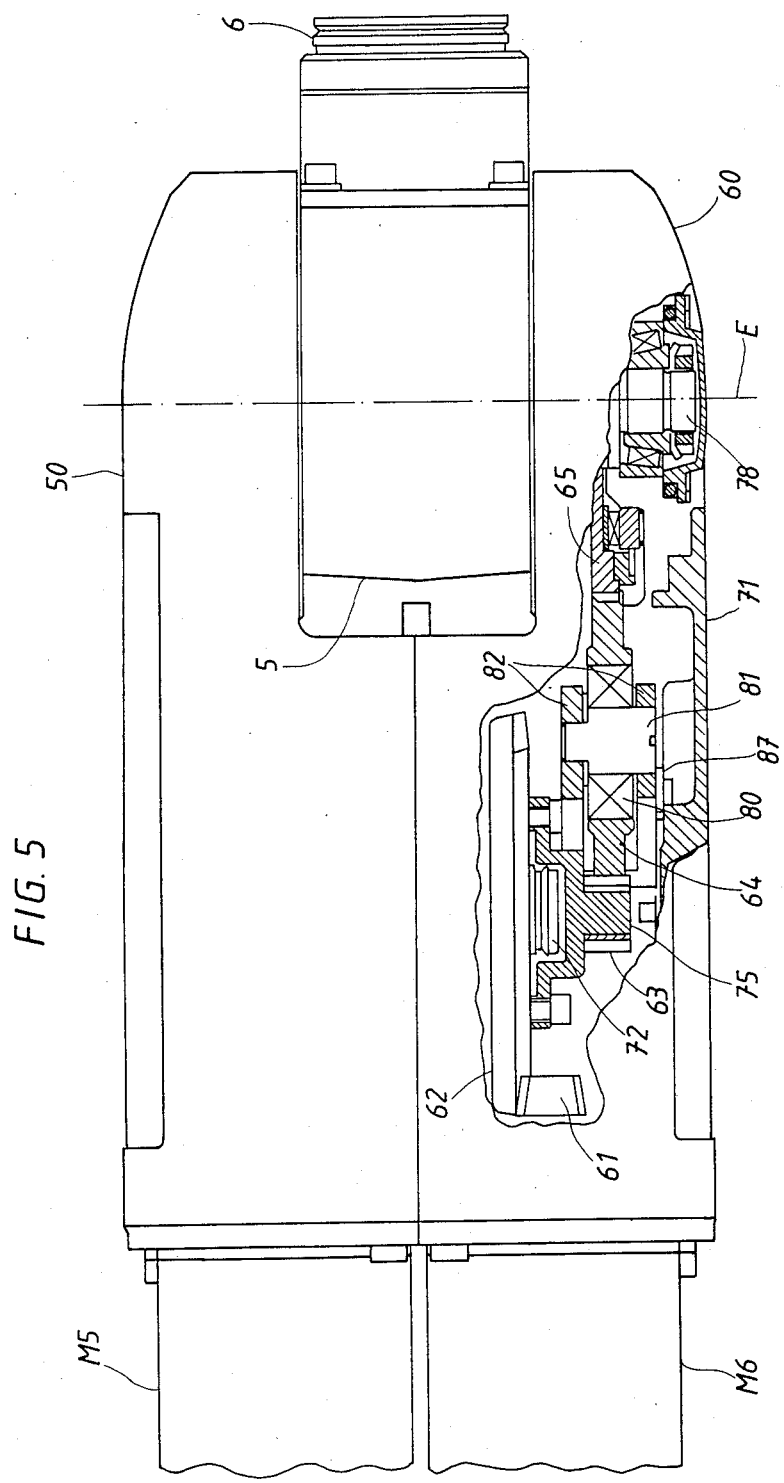
FIG. 5 is a top view of the wrist shown partly in section.

FIGS. 4 and 5 show the construction of the central part of the drive means in one of the two identical wrist halves. A shaft pin 72 is fixed in one of the halves, 71, of the wrist housing, the bevel gear wheel 62 being rotatably journalled on that shaft pin 72. A shaft pin 75 is screwed to the gear wheel 62, the cylindrical gear pinion 63 being fixed on that shaft pin 75. The shaft pins 72 and 75 are coaxial. The drive motor M6 is screwed to the wrist housing half 71, the gear pinion 61 being fixed on the shaft of the drive motor M6 and being in engagement with the gear wheel 62.

The gear pinion (wheel) 63 drives the cylindrical gear wheel 65 via the intermediate wheel 64. The gear wheel 65 is rotatably journalled on the tilt shaft 78, which in turn is rotatably journalled in the wrist housing about the axis E.

The intermediate wheel 64 is journalled, by means of a ball bearing 80, on an eccentric shaft (bearing) pin 81, which is turnably fixed on a substantially annular sector-shaped adjusting disc 82. This disc 82 is guided by a circular-cylindrical wall surface 83 in the wrist housing and can be displaced, by means of two adjusting screws 84, 85, along a circular path, the centre of which coincides with the axis of rotation of the pinion 63. The adjusting screws 84, 85 are fixed in an annular sector-shaped counter support 86 which is secured in the wrist housing.

When adjusting the backlash between the cylindrical gear wheels 63, 64 and 65, the eccentric shaft pin 81 is first turned until the desired backlash between the wheels 63 and 64 is attained, whereupon the shaft pin 81 is locked in its position by screwing a washer 87 to the shaft end. Thereafter, the adjusting disc 82 is turned by means of the adjusting screws 84, 85 until the desired backlash is attained between the wheels 64 and 65.

It is also possible to perform the backlash adjusting in one single step provided that the shaft pin 81 has sufficiently great eccentricity to be able to turn when the adjusting disc 82 is displaced. The intermediate wheel 64 will then seek its position between the wheels 63 and 65.

Figure 6:
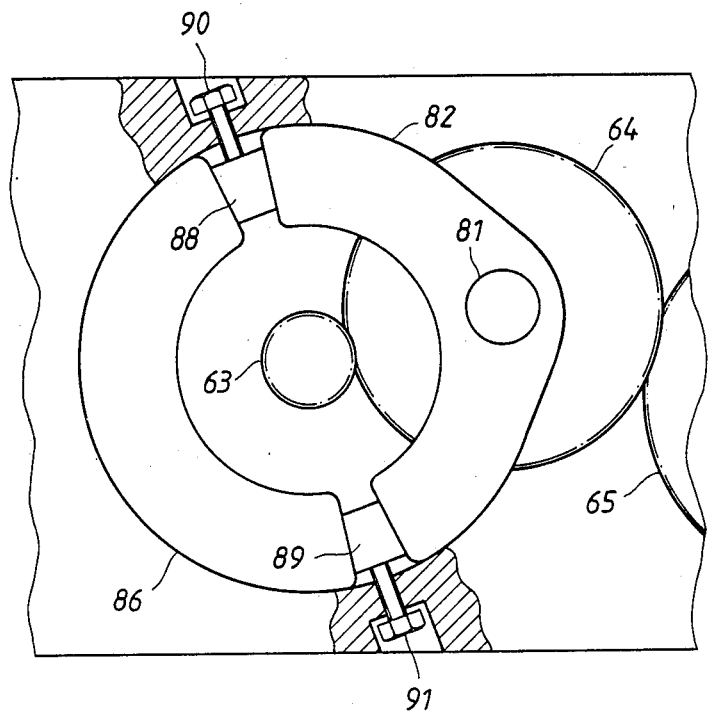
FIG. 6 is an explanatory sketch showing an alternative embodiment of the cylindrical gear unit of the wrist.

FIG. 6 shows an alternative embodiment of the means for adjusting the backlash. In this embodiment, wedge members 88, 89 are used instead of the adjusting screws 84, 85, these wedge members being insertable and withdrawable between the movable support 82 and the counter support 86 by means of screws 90, 91 from outside the wrist housing 71.

The invention is not limited to the embodiment shown but several modifications are feasible. If the gear wheels and the bearings in the wrist housing are designed with high precision, for example, the shaft pin 81 need not be eccentric.

Furthermore, the counter support 86 need not be a separate member fixedly mounted in the wrist housing. If the housing is die-cast, it may be more convenient for the counter support to be in the form of shoulders integrated with the housing. In that case the adjusting screws 84, 85 will have their threads in the disc 82 and their heads against the cast shoulders in the wrist housing.

Instead of the adjusting disc 82 being guided by the cylindrical wall surface 83 in the wrist housing, the disc 82 may alternatively be guided by the shaft pin 75. However, this solution is somewhat inferior since the shaft end 75 in that case has to be made longer, which entails a greater width dimension of the wrist. In addition, the shaft forces of the intermediate wheel have to be absorbed by this longer shaft end, which may then be subjected to deformations which deteriorate the accuracy of repetition of the robot.

I claim:

1. A robot wrist comprising a wrist housing mounted on a robot arm; a tilt which is journalled in said wrist housing to be rotatable about a tilt axis which is perpendicular to a longitudinal axis of said robot arm; a tool attachment rotatably journalled in said tilt; and drive means for rotating said tilt and said tool attachment, said drive means comprising at least one gear train which includes a first cylindrical gear wheel, a second cylindrical gear wheel, and an intermediate cylindrical gear wheel which interengages with said first and second gear wheels, said cylindrical gear wheels having parallel axes of rotation, said intermediate cylindrical gear wheel being journalled on a movable support member which is displaceable by means of adjusting members along a circular path defined by a circular cylindrical guide surface provided in said housing, said circular cylindrical guide surface having an axis of curvature which coincides with the axis of rotation of said first cylindrical gear wheel, and a surface part of said movable support member being arranged to bear against said circular cylindrical guide surface.

2. A robot wrist according to claim 1, wherein said movable support member is substantially annular sector shaped and has two end surfaces, wherein a counter support member is positioned in said wrist housing, and wherein said adjusting members comprise two adjusting screws which are arranged between said end surfaces of the movable support member and said counter support member for pressing said movable support member against said circular cylindrical guide surface of said wrist housing.

3. A robot wrist according to claim 2, wherein said first cylindrical gear wheel includes a shaft, and wherein said counter support member is substantially annular sector shaped and, together with said movable support member, surrounds said shaft.

4. A robot wrist according to claim 1, wherein a counter support member is positioned in said wrist housing, and said adjusting members consist of wedge members which are displaceable between said movable support member and said counter support member.

5. A robot wrist comprising a wrist housing mounted on a robot arm; a tilt which is journalled in said wrist housing to be rotatable about a tilt axis which is perpendicular to a longitudinal axis of said robot arm; a tool attachment rotatably journalled in said tilt; and drive means for rotating said tilt and said tool attachment, said drive means comprising at least one gear train which includes a first cylindrical gear wheel, a second cylindrical gear wheel, and an intermediate gear wheel which interengages with said first and second cylindrical gear wheels, said cylindrical gear wheels having parallel axes of rotation, said intermediate gear wheel being journalled on an eccentric bearing pin arranged on a movable support member which is displaceable by means of adjusting members along a circular path whose centre coincides with the axis of rotation of said first cylindrical gear wheel.

6. A robot wrist according to claim 5, wherein a locking member is arranged on said movable support member for fixing said eccentric bearing pin in a desired position.

7. A robot wrist according to claim 5, wherein said wrist housing provides a guide surface, wherein said movable support member is substantially annular sector shaped and has two end surfaces, wherein a counter support member is positioned in said wrist housing, and wherein said adjusting members comprise two adjusting screws which are arranged between said end surfaces of the movable support member and said counter support member for pressing said movable support member against said guide surface.

8. A robot wrist according to claim 7, wherein said first cylindrical gear wheel includes a shaft, and wherein said counter support member is substantially annular sector shaped and, together with said movable support member, surrounds said shaft.

9. A robot wrist according to claim 5, wherein a counter support member is positioned in said wrist housing, and said adjusting members consist of wedge members which are displaceable between said movable support member and said counter support member.

10. A robot wrist which is attachable to a robot arm so as to be aligned with a longitudinal axis of said robot arm, said robot wrist including a wrist housing which provides a circular cylindrical guide surface defining an axis of curvature perpendicular to said longitudinal axis; a tilt which is turnably journalled in said housing so as to be rotatable about a tilt axis which is parallel to said imaginary axis, said tilt including a first cylindrical gear wheel whose axis is coaxial with said tilt axis; a tool attachment which is rotatably journalled in said tilt; a second cylindrical gear wheel rotatably mounted within said wrist housing, said second cylindrical gear wheel having an axis of rotation which is coaxial with said axis of curvature; a third cylindrical gear wheel which is located within said wrist housing and which has an axis which is parallel to said axis of curvature, said third cylindrical gear wheel being positionable between and engageable with both said first and second cylindrical gear wheels; a support means on which said third cylindrical gear wheel is rotatably mounted and which is movable along said circular cylindrical guide surface; and adjustment means for determining the position of said support means along said circular cylindrical guide surface and thus the amount of backlash between said third cylindrical gear wheel and said second cylindrical gear wheel.

11. A robot wrist according to claim 10, wherein said support means includes a substantially sector-shaped support member which includes opposite end surfaces, and wherein said adjustment means comprises a counter support member positioned within said wrist housing and including two adjusting screws extending between said counter support member and respectively the opposite end surfaces of said substantially sector-shaped support member, adjustments to said adjusting screws causing said substantially sector-shaped support member to be moved along said circular cylindrical guide surface.

12. A robot wrist according to claim 11, wherein said support means includes an eccentric bearing pin which extends through said substantially sector-shaped support member, said third cylindrical gear wheel being rotatably mounted on said eccentric bearing pin.

13. A robot wrist according to claim 10, wherein said support means includes a substantially sector-shaped support member which includes opposite end surfaces; and wherein said adjustment means includes a substantially sector-shaped counter support member which is positioned within said wrist housing and which includes opposite end surfaces that face the opposite end surfaces of said support member, and two wedge members which are movable between the respective facing end surfaces of said support member and said counter support member.

* * * * *